United States Patent
Neystadt et al.

(10) Patent No.: US 12,287,762 B2
(45) Date of Patent: Apr. 29, 2025

(54) OPTIMIZED FILE CLASSIFICATION WITH SUPERVISED LEARNING

(71) Applicant: VARONIS SYSTEMS, INC., New York, NY (US)

(72) Inventors: John Eugene Neystadt, Kfar-Saba (IL); Amit Cohen, Kfar Saba (IL)

(73) Assignee: VARONIS SYSTEMS, INC., NY (US)

( * ) Notice: Subject to any disclaimer, the term of this patent is extended or adjusted under 35 U.S.C. 154(b) by 0 days.

(21) Appl. No.: 18/109,958

(22) Filed: Feb. 15, 2023

(65) Prior Publication Data

US 2024/0273066 A1  Aug. 15, 2024

(51) Int. Cl.
*G06F 16/10* (2019.01)
*G06F 16/16* (2019.01)

(52) U.S. Cl.
CPC .................................. *G06F 16/164* (2019.01)

(58) Field of Classification Search
CPC .................................................... G06F 16/164
See application file for complete search history.

(56) References Cited

U.S. PATENT DOCUMENTS

| | | | |
|---|---|---|---|
| 10,884,981 B1* | 1/2021 | Kakita | G06F 16/144 |
| 11,106,716 B2 | 8/2021 | Bhowan et al. | |
| 2010/0042610 A1 | 2/2010 | Lakhani et al. | |
| 2016/0232456 A1* | 8/2016 | Jain | G06F 16/383 |
| 2017/0132413 A1* | 5/2017 | Augustýn | G06F 16/164 |
| 2018/0075138 A1 | 3/2018 | Perram et al. | |
| 2020/0019767 A1 | 1/2020 | Porter et al. | |
| 2020/0242159 A1* | 7/2020 | Dain | G06F 16/906 |
| 2020/0342059 A1 | 10/2020 | Ziuzin et al. | |
| 2021/0295104 A1 | 9/2021 | Squires et al. | |
| 2022/0172042 A1 | 6/2022 | Zinchenko et al. | |
| 2023/0251999 A1* | 8/2023 | Woodward | G06F 16/164 |
| | | | 707/822 |
| 2024/0134977 A1* | 4/2024 | Sevcenko | G06F 21/565 |

* cited by examiner

*Primary Examiner* — Kristopher Andersen
(74) *Attorney, Agent, or Firm* — SOROKER AGMON NORDMAN RIBA

(57) ABSTRACT

A method of classifying a file, including extracting metadata from the file, assigning a classification for the file by applying a machine learning model that was trained to classify files based on the metadata, determining a confidence level representing an accuracy of the classification, wherein if the confidence level is below a threshold value analyze the content of the file to assign a classification for the file based on the content; and store the assigned file classification.

17 Claims, 3 Drawing Sheets

OPTIMIZED FILE CLASSIFICATION WITH SUPERVISED LEARNING

FIELD OF THE DISCLOSURE

The present disclosure relates to a system for file classification and more specifically to file classification using metadata.

BACKGROUND OF THE DISCLOSURE

File classification serves many purposes, for example to manage data permissions and prevent accidental or malicious exfiltration of sensitive information from an organization. The classification process is highly CPU intensive, typically requiring text extraction, possibly an optical character recognition (OCR) or audio recognition and then scanning the data to match predefined keywords and rules.

Many methods have been suggested to perform classification including text analysis with classification according to preselected topics or training machine learning models. Generally, the intensive CPU requirements increase the cost of classification systems and increase the response delay in accessing data that undergoes classification. Thus, it is desirable to find methods that reduce the classification overhead and speed up the process.

SUMMARY OF THE DISCLOSURE

An aspect of an embodiment of the disclosure, relates to a system and method for expediting file classification by classifying based on metadata instead of by the file content. Initially classifying a set of files based on their content. Using the classified set of files with their metadata to train a machine learning model. Then receiving files to be classified and applying the trained machine learning model to assign the file a classification based on the metadata of the file. Optionally, the metadata of the file is enriched by information related to the metadata of the file.

There is thus provided by an embodiment of the disclosure, a method of classifying a file, comprising:
Extracting metadata from the file;
Assigning a classification for the file by applying a machine learning model that was trained to classify files based on the metadata;
Determining a confidence level representing an accuracy of the classification;
Wherein if the confidence level is below a threshold value analyzing the content of the file to assign a classification for the file based on the content; and
storing the assigned file classification.

In an embodiment of the disclosure, the metadata is enriched with information related to the metadata. Optionally, the machine learning model is generated based on a set of files and their metadata, wherein the files were classified based on their content. In an embodiment of the disclosure, the confidence level is determined based on the quality of the metadata. Optionally, the classification is stored as metadata in the file. In an embodiment of the disclosure, the classification is stored in the directory information related to the file. Alternatively or additionally, the classification is stored in an organizational database accessible over an organizational network. In an embodiment of the disclosure, classifying the file is performed locally for files on a computer. Optionally, classifying the file is performed remotely at an organizational network server computer for files from computers connected to the organizational network. In an embodiment of the disclosure, the file classification is used to permit or to prevent access to the file for specific users.

There is further provided according to an embodiment of the disclosure, a system for classifying a file, comprising:
A computer with a processor and memory;
A program for executing on the computer, wherein the program is configured to perform the following when executed by the computer:
Extracting metadata from the file;
Assigning a classification for the file by applying a machine learning model that was trained to classify files based on the metadata;
Determining a confidence level representing an accuracy of the classification;
Wherein if the confidence level is below a threshold value analyzing the content of the file to assign a classification for the file based on the content; and
storing the assigned file classification.

In an embodiment of the disclosure, the metadata is enriched with information related to the metadata. Optionally, the machine learning model is generated based on a set of files and their metadata, wherein the files were classified based on their content. In an embodiment of the disclosure, the confidence level is determined based on the quality of the metadata. Optionally, the classification is stored as metadata in the file. In an embodiment of the disclosure, the classification is stored in the directory information related to the file. Alternatively or additionally, the classification is stored in an organizational database accessible over an organizational network. In an embodiment of the disclosure, classifying the file is performed locally for files on a computer. Optionally, classifying the file is performed remotely at an organizational network server computer for files from computers connected to the organizational network. In an embodiment of the disclosure, the file classification is used to permit or to prevent access to the file for specific users.

There is further provided according to an embodiment of the disclosure, a non-transitory computer readable medium comprising an executable program configured to perform the method described above.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear, wherein.

DETAILED DESCRIPTION

Figure 1:
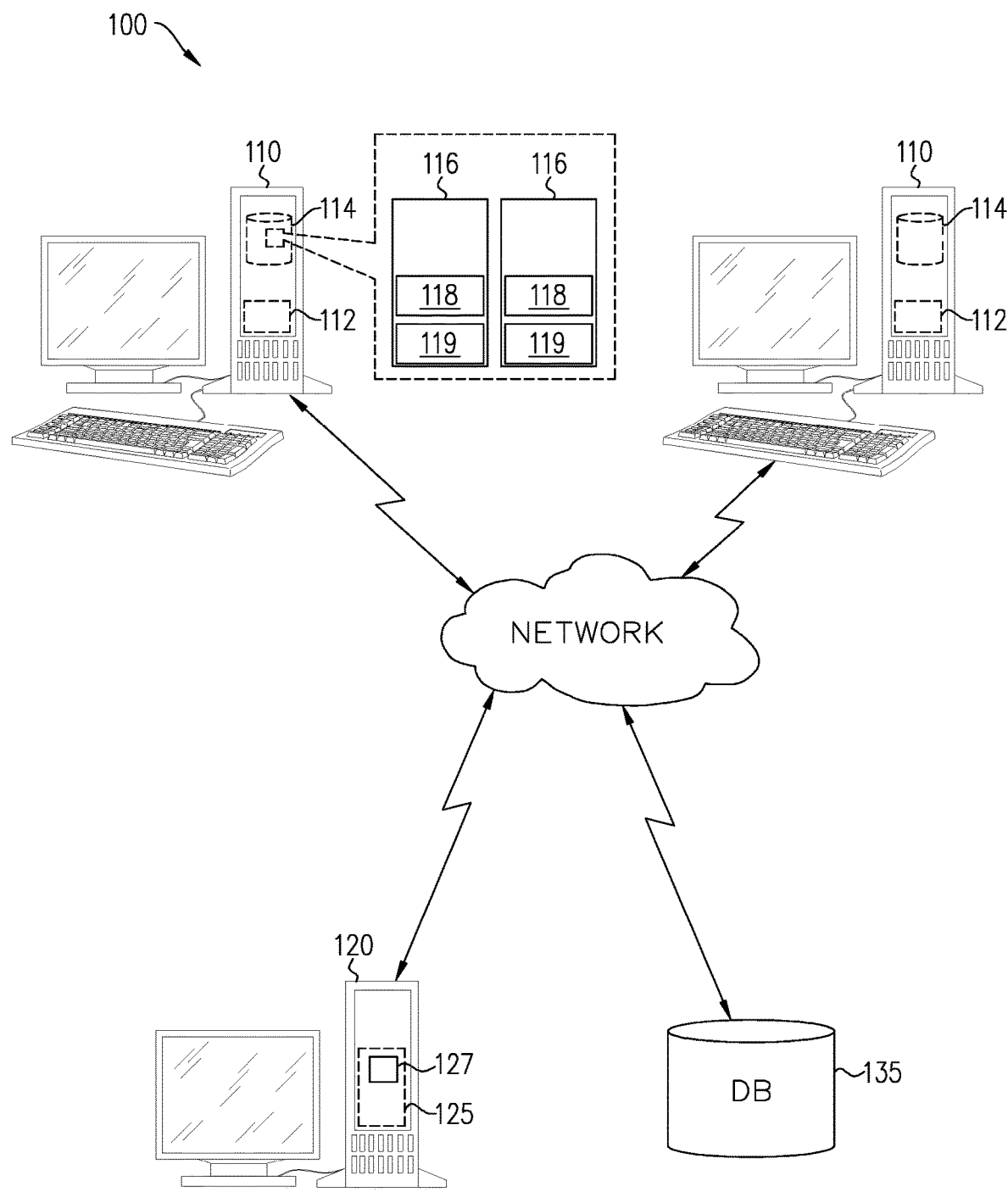
FIG. 1 is a schematic illustration of a system for classifying data, according to an embodiment of the disclosure.

FIG. 1 is a schematic illustration of a system 100 for classifying data, according to an embodiment of the disclosure. System 100 includes one or more computers 110 that optionally communicate over a network 130 (e.g., an organizational/enterprise network). Optionally, each computer 110 may include a local classification program 112 and a local storage 114 (e.g., a hard drive) that stores data. the data may include files 116 with metadata 118 providing information about the file 116. The metadata includes, for example:

1. Owner or creator name;
2. Editor name or names;
3. File size;
4. Timestamp of creation;
5. Timestamp of last update;
6. Storage location (e.g., folder, volume, computer);
7. File type (e.g. text file (doc), spreadsheet (xls), associated application for accessing the file);
8. Classification of neighbor files.

In an embodiment of the disclosure, the network includes a server computer 120 with a program 125 e.g., a machine learning program configured to generate a classification model 127 that correlates file metadata 118 with a file classification 119. Optionally, local classification programs 112 may use the model 127 locally to classify files 116 or may submit files to server computer 120 to generate classification 119 with model 127 and store the classification 119 locally, for example as part of the metadata of the file. Thus instead of using a time consuming classifying program based on analyzing the file content, for example with text extraction and pattern matching, the current model 127 is based on the file metadata 118, which is generally much more concise than the file content.

In some embodiments of the disclosure, local classification program 112 dynamically produces a confidence score based on the available metadata 118 and/or based on the results of applying classification model 127. The confidence score provides an indication of the accuracy of the classification based on the metadata. If the confidence score is equal to or below a threshold value local classification program 112 may fallback to full content classification. Otherwise, if the confidence score is above the threshold value the classification of classification model 127 is used, thus reducing computation expenses. The confidence score may be determined by the quality of the metadata or other parameters. For example, if the metadata is lacking or meaningless, the confidence score will be low.

In an embodiment of the disclosure, the classification 119 is stored as additional metadata 118 of the file 116, for example as an RMS label. Alternatively, the classification 119 is stored as a file property on a file system or in an external system (e.g., in an organizational database 135). Optionally, the file classification is used in applying remediation actions related to the file, for example:

1. Enabling or blocking access to the file;
2. Requiring a specific access role, for example files with a specific classification (e.g., financial report) may be accessible only by users with a specific access role (e.g., belonging to a specific security group such as finance department users);
3. Requiring step-up authentication for access, for example files with a specific classification (e.g., employee information) may be accessible only by users that are strongly authenticated, thus a user that was only authenticated by a password may be prompted to perform a second factor authentication (e.g., requiring the user to enter a one-time code sent via SMS or Email) before allowing to access the classified files.

In an embodiment of the disclosure, the metadata 118 used for classification may be enriched by including metadata of the metadata, for example metadata of the file creator, file editor or file storage location. File creator metadata and file editor metadata may include, for example groups they belong to, organizational roles or risk level assigned to them. File storage metadata may include location ownership or a security level associated with the file 116. Additionally, the file storage metadata may include classification values of neighbor files in the same directory or subdirectories, for example if a folder includes sensitive files, it is more likely that the current file is also sensitive. The same applies to a folder comprising other folders with sensitive data.

In an embodiment of the disclosure, the classification model 127 is regenerated periodically to improve accuracy, for example based on an accumulation of newly classified files. Optionally, when regenerating the classification model 127 is fully regenerated or incrementally updated, for example by referential learning. In some embodiments of the disclosure, the classification model is regenerated whenever classification rules change or dictionaries change.

Figure 2:
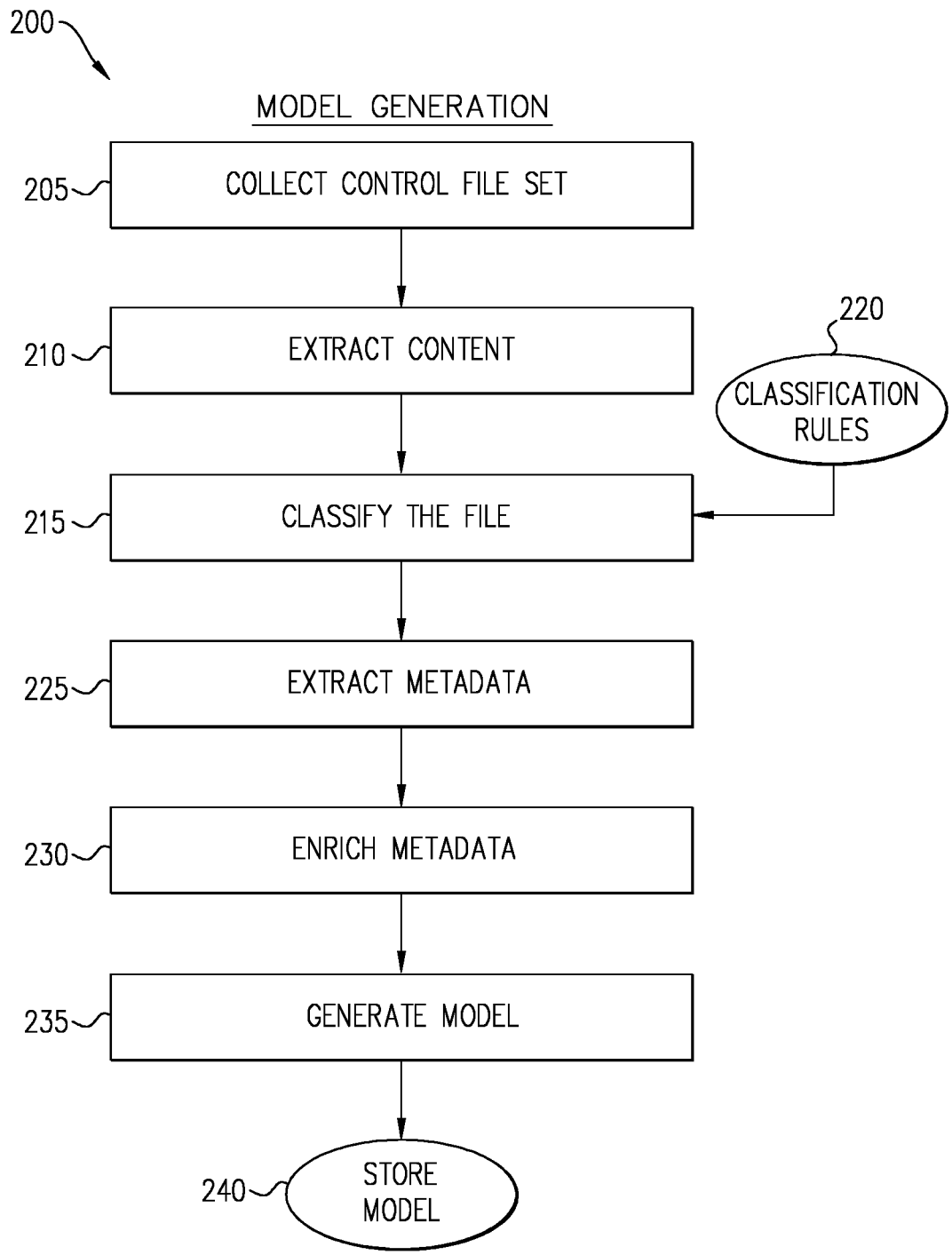
FIG. 2. Is a flow diagram of a process of generating a model for classifying data, according to an embodiment of the disclosure.

FIG. 2. Is a flow diagram of a process 200 of generating a model 127 for classifying data, according to an embodiment of the disclosure. Initially system 100 (e.g. program 125 on server computer 120) collects (205) a control file set to prepare the model 127. The content of the files are extracted (210) for analysis, for example by extracting text, performing OCR on image data and performing speech to text for audio data. The extracted content of each file is then classified (215) according to classification rules (220). Optionally classification may include regular expression and keyword matching proximity, reoccurrence and other rules. In some embodiments of the disclosure, a user may classify the files manually. Once the files are classified metadata of the files are extracted (225). Optionally, the metadata is enriched (230) with information about the metadata, for example details about the owner/creator/editor of the file. The details may include information related to their role or history of a specific user. the information can be extracted from a dedicated database, a directory service or other repository. Additionally, the enrichment information can be related to the containing directory/folder/volume, for example regarding the nature of files in a specific directory.

In an embodiment of the disclosure, program 125 uses the file information as described above (file contents, classification, metadata and metadata enrichment information) with a machine learning algorithm to produce model 127. The model may be stored (240) in the organizational database 135 and/or distributed to the network computers 110 to classify files locally.

Figure 3:
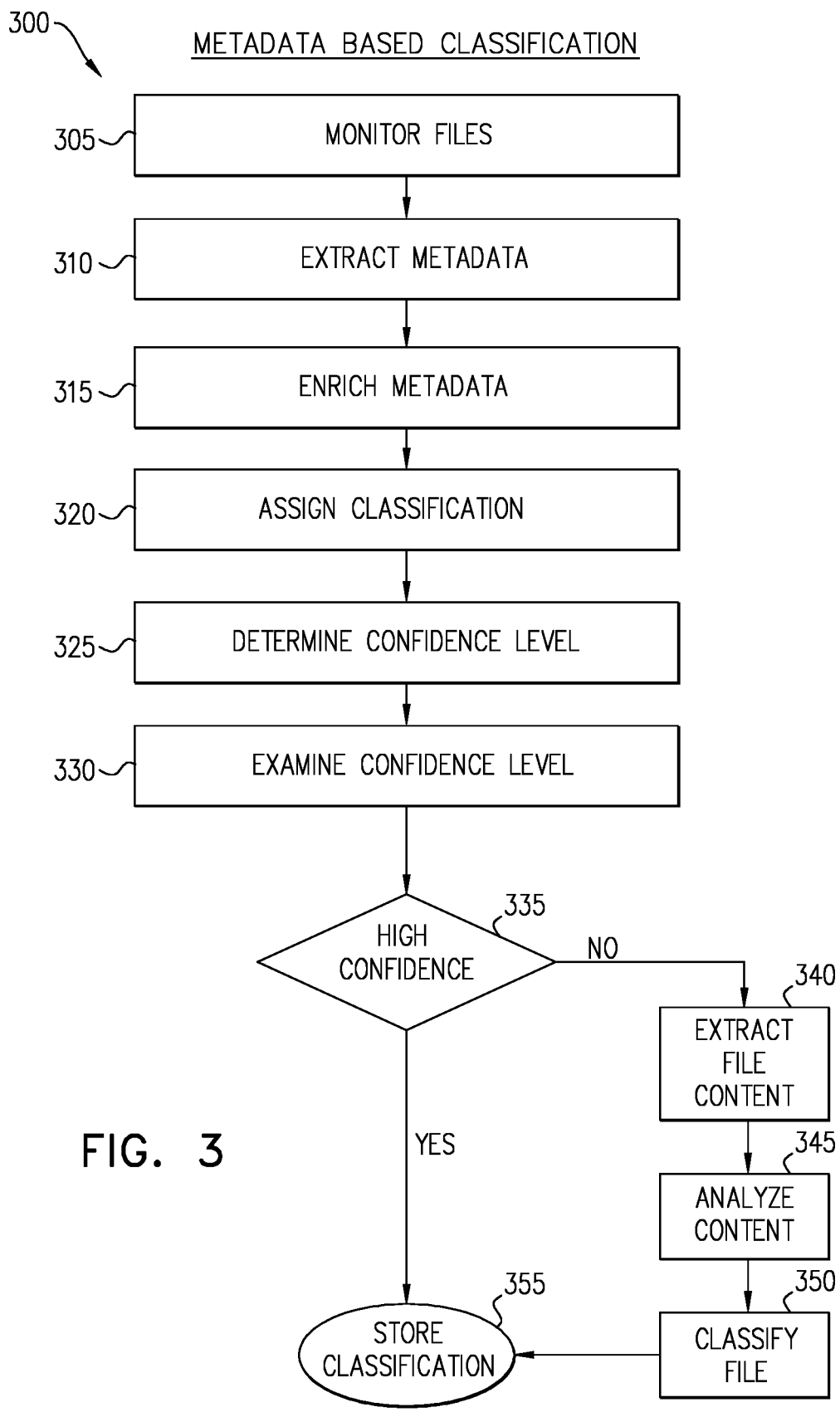
FIG. 3 is a flow diagram of a process of using a model for classifying data, according to an embodiment of the disclosure.

FIG. 3 is a flow diagram of a process 300 of using model 127 for classifying data, according to an embodiment of the disclosure. In an embodiment of the disclosure, local computer 110 monitors (305) file creation and modification. Upon modification of a file or creation of a new file the local classification program 112 applies model 127 either locally or at server computer 120 to classify the modified or new file. Model 127 extracts (310) metadata 118 and optionally enriches (315) the metadata 118 with information related to the metadata 118. Model 127 processes the metadata 118 to assign (320) a classification based on the metadata. In an embodiment of the disclosure, a confidence level is determined (325) based on the metadata and classification, the confidence level representing a level as to the accuracy of the classification. The confidence level is examined (330) relative to a threshold value. If the confidence level is high (335), for example equal to or above the threshold value then the classification is considered acceptable and stored (355) with the file metadata 118 or in another storage repository (e.g., in the directory tables or in the organizational database 135). Alternatively, if the confidence level is below the threshold value other classification methods are applied, for example standard content classification by extracting (340) the file content and analyzing (345) the content to classify (350) the file 116 based on the content. The resulting classification is then stored (355).

In an embodiment of the disclosure, programs 112 and 125 may be stored on a non-transitory computer readable memory and provided to a computer such as computer 110 and/or central server 120, which include a processor and memory. Programs 112 and 125 can be loaded into the memory of the computer and executed by the processor to implement the methods described above for classifying files. Optionally, the non-transitory memory may be a CD, DVD, flash disk or other non-volatile memory devices.

It should be appreciated that the above-described methods and apparatus may be varied in many ways, including omitting, or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure.

It will be appreciated by persons skilled in the art that the present invention is not limited to what has been particularly shown and described hereinabove. Rather the scope of the present invention is defined only by the claims, which follow.

We claim:

1. A method of classifying a file locally at a computer, comprising:
   extracting metadata from the file;
   assigning a classification for the file by applying a machine learning model that was trained to classify files based on the metadata; wherein the machine learning model is provided by a remote server to classify files locally at the computer;
   determining a confidence level representing an accuracy of the classification;
   wherein if the confidence level is below a threshold value analyzing the content of the file to assign a classification for the file based on the content;
   storing the assigned file classification; wherein the classification is stored as metadata in the file; and
   permitting or preventing access to the file by a user of the computer responsive to the assigned classification;
   wherein at least one classification requires a second factor authentication by the user, wherein the user is required to enter a onetime code received in an SMS or Email in addition to entering a password.

2. The method of claim 1, wherein the metadata is enriched with information related to file creator metadata or file editor metadata, including risk levels assigned to them.

3. The method of claim 1, wherein the machine learning model is generated based on a set of files and their metadata, wherein the set of files were classified based on their content.

4. The method of claim 1, wherein the confidence level is determined based on a quality of the metadata.

5. The method of claim 1, wherein the classification is also stored in directory information related to the file.

6. The method of claim 1, wherein the classification is also stored in an organizational database accessible over an organizational network.

7. The method of claim 1, wherein the metadata of the file includes classifications of neighbor files.

8. The method of claim 1, wherein the metadata is enriched with information related to file storage metadata, including location ownership or a security level associated with the file.

9. A system for classifying a file locally at a computer, comprising:
   the computer comprising a processor and memory;
   a program for executing on the computer, wherein the program is configured to perform the following when executed by the computer:
   extracting metadata from the file;
   assigning a classification for the file by applying a machine learning model that was trained to classify files based on the metadata; wherein the machine learning model is provided by a remote server to classify files locally at the computer;
   determining a confidence level representing an accuracy of the classification;
   wherein if the confidence level is below a threshold value analyzing the content of the file to assign a classification for the file based on the content;
   storing the assigned file classification; wherein the classification is stored as metadata in the file; and
   wherein the assigned classification is used to permit or prevent access to the file by a user of the computer;
   wherein at least one classification requires a second factor authentication by the user, wherein the user is required to enter a onetime code received in an SMS or Email in addition to entering a password.

10. The system of claim 9, wherein the metadata is enriched with information related to file creator metadata or file editor metadata, including risk levels assigned to them.

11. The system of claim 9, wherein the machine learning model is generated based on a set of files and their metadata, wherein the set of files were classified based on their content.

12. The system of claim 9, wherein the confidence level is determined based on a quality of the metadata.

13. The system of claim 9, wherein the classification is also stored in directory information related to the file.

14. The system of claim 9, wherein the classification is also stored in an organizational database accessible over an organizational network.

15. The system of claim 9, wherein the metadata of the file includes classifications of neighbor files.

16. The system of claim 9, wherein the metadata is enriched with information related to file storage metadata, including location ownership or a security level associated with the file.

17. A non-transitory computer readable medium comprising an executable program configured to perform a method of claim 1.

* * * * *